(12) United States Patent
Noh et al.

(10) Patent No.: US 10,404,491 B2
(45) Date of Patent: Sep. 3, 2019

(54) DEVICE AND METHOD FOR ESTIMATING CHANNEL IN COMMUNICATION SYSTEM

(71) Applicant: Samsung Electronics Co., Ltd., Gyeonggi-do (KR)

(72) Inventors: Jee-Hwan Noh, Suwon-si (KR); Tae-Young Kim, Seoul (KR); Ji-Yun Seol, Seongnam-si (KR); Hyun-Il Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 15/567,360

(22) PCT Filed: Apr. 14, 2016

(86) PCT No.: PCT/KR2016/003868
§ 371 (c)(1),
(2) Date: Oct. 17, 2017

(87) PCT Pub. No.: WO2016/167557
PCT Pub. Date: Oct. 20, 2016

(65) Prior Publication Data
US 2018/0109402 A1    Apr. 19, 2018

(30) Foreign Application Priority Data

Apr. 17, 2015  (KR) .......................... 10-2015-0054527
Jul. 22, 2015  (KR) .......................... 10-2015-0103892

(51) Int. Cl.
*H04B 7/06*      (2006.01)
*H04L 25/02*     (2006.01)
(Continued)

(52) U.S. Cl.
CPC ....... *H04L 25/0204* (2013.01); *H04B 7/0621* (2013.01); *H04J 13/0062* (2013.01);
(Continued)

(58) Field of Classification Search
None
See application file for complete search history.

(56) References Cited

U.S. PATENT DOCUMENTS

| 8,429,502 B2 | 4/2013 | Lakkis |
| 2006/0182191 A1* | 8/2006 | Darwood ............. H04B 7/0632 375/267 |

(Continued)

FOREIGN PATENT DOCUMENTS

KR      20130066805 A     6/2013

*Primary Examiner* — Brian S Roberts

(57) ABSTRACT

Disclosed are: a communication technique for fusing, with IoT technology, a 5G communication system for supporting a data transmission rate higher than that of a 4G communication system; and a system therefor. The communication technique can be applied, on the basis of 5G communication technology and IoT-related technology, to intelligent services (for example, smart home, smart building, smart city, smart car or connected car, health care, digital education, retail, security and safety-related services, and the like). A method for estimating a channel in a communication system, according to one embodiment of the present invention, comprises the steps of: confirming a code and antenna distinguishing scheme used in channel estimation; generating a channel estimation code on the basis of the confirmed code and antenna distinguishing scheme; and transmitting the generated channel estimation code through a plurality of transmission antennas.

20 Claims, 14 Drawing Sheets

(51) Int. Cl.
*H04J 13/00* (2011.01)
*H04W 72/02* (2009.01)
*H04W 72/04* (2009.01)
*H04B 7/0413* (2017.01)

(52) U.S. Cl.
CPC ........ *H04L 25/0226* (2013.01); *H04B 7/0413* (2013.01); *H04W 72/02* (2013.01); *H04W 72/0453* (2013.01)

(56) References Cited

U.S. PATENT DOCUMENTS

| | | | |
|---|---|---|---|
| 2009/0061784 A1* | 3/2009 | Cordeiro | H04B 7/0413 455/68 |
| 2010/0069122 A1* | 3/2010 | Ito | H04B 7/0684 455/562.1 |
| 2011/0209035 A1 | 8/2011 | Lakkis | |
| 2013/0083865 A1* | 4/2013 | Wu | H04B 7/0617 375/267 |
| 2014/0105054 A1 | 4/2014 | Saegrov et al. | |
| 2015/0092742 A1 | 4/2015 | Han et al. | |

* cited by examiner $(Ant.1, t_1) \rightarrow a$

|       | $t_1$ | $t_2$ | $t_1$ | $t_2$ | $t_1$ | $t_2$ | $t_1$ | $t_2$ |
|-------|-------|-------|-------|-------|-------|-------|-------|-------|
| Ant.1 | a | $-b_{-1}$ | a | $b_{-1}$ | a | $b_{-1}$ | a | $-b_{-1}$ |
| Ant.2 | b | $a_{-1}$ | b | $-a_{-1}$ | -b | $a_{-1}$ | -b | $-a_{-1}$ |
| Ant.1 | -a | $b_{-1}$ | -a | $-b_{-1}$ | -a | $-b_{-1}$ | -a | $b_{-1}$ |
| Ant.2 | b | $a_{-1}$ | b | $-a_{-1}$ | -b | $a_{-1}$ | -b | $-a_{-1}$ |
| Ant.1 | a | -b | a | b | a | b | a | -b |
| Ant.2 | $b_{-1}$ | $a_{-1}$ | $b_{-1}$ | $-a_{-1}$ | $-b_{-1}$ | $a_{-1}$ | $-b_{-1}$ | $-a_{-1}$ |
| Ant.1 | -a | b | -a | -b | -a | -b | -a | b |
| Ant.2 | $b_{-1}$ | $a_{-1}$ | $b_{-1}$ | $-a_{-1}$ | $-b_{-1}$ | $a_{-1}$ | $-b_{-1}$ | $-a_{-1}$ |

FIG.8A $(Ant.1, t_1) \rightarrow a_{-1}$

|       | $t_1$ | $t_2$ | $t_1$ | $t_2$ | $t_1$ | $t_2$ | $t_1$ | $t_2$ |
|-------|-------|-------|-------|-------|-------|-------|-------|-------|
| Ant.1 | $a_{-1}$ | $-b_{-1}$ | $a_{-1}$ | $b_{-1}$ | $a_{-1}$ | $b_{-1}$ | $a_{-1}$ | $-b_{-1}$ |
| Ant.2 | b | a | b | -a | -b | a | -b | -a |
| Ant.1 | $-a_{-1}$ | $b_{-1}$ | $-a_{-1}$ | $-b_{-1}$ | $-a_{-1}$ | $-b_{-1}$ | $-a_{-1}$ | $b_{-1}$ |
| Ant.2 | b | a | b | -a | -b | a | -b | -a |
| Ant.1 | $a_{-1}$ | -b | $a_{-1}$ | b | $a_{-1}$ | b | $a_{-1}$ | -b |
| Ant.2 | $b_{-1}$ | a | $b_{-1}$ | -a | $-b_{-1}$ | a | $-b_{-1}$ | -a |
| Ant.1 | $-a_{-1}$ | b | $-a_{-1}$ | -b | $-a_{-1}$ | -b | $-a_{-1}$ | b |
| Ant.2 | $b_{-1}$ | a | $b_{-1}$ | -a | $-b_{-1}$ | a | $-b_{-1}$ | -a |

FIG.8B

(Ant.1, t₁) → b

| | $t_1$ | $t_2$ | $t_1$ | $t_2$ | $t_1$ | $t_2$ | $t_1$ | $t_2$ |
|---|---|---|---|---|---|---|---|---|
| Ant.1 | $b$ | $-a_{-1}$ | $b$ | $a_{-1}$ | $b$ | $a_{-1}$ | $b$ | $a_{-1}$ |
| Ant.2 | $a$ | $b_{-1}$ | $a$ | $-b_{-1}$ | $-a$ | $b_{-1}$ | $-a$ | $-b_{-1}$ |
| Ant.1 | $-b$ | $a_{-1}$ | $-b$ | $-a_{-1}$ | $-b$ | $-a_{-1}$ | $-b$ | $a_{-1}$ |
| Ant.2 | $a$ | $b_{-1}$ | $b$ | $-b_{-1}$ | $a$ | $b_{-1}$ | $a$ | $-b_{-1}$ |
| Ant.1 | $b$ | $-a$ | $b$ | $a$ | $b$ | $a$ | $b$ | $-a$ |
| Ant.2 | $a_{-1}$ | $b_{-1}$ | $a_{-1}$ | $-b_{-1}$ | $-a_{-1}$ | $b_{-1}$ | $-a_{-1}$ | $-b_{-1}$ |
| Ant.1 | $-b$ | $a$ | $-b$ | $-a$ | $-b$ | $-a$ | $-b$ | $a$ |
| Ant.2 | $a_{-1}$ | $b_{-1}$ | $a_{-1}$ | $-b_{-1}$ | $-a_{-1}$ | $b_{-1}$ | $-a_{-1}$ | $-b_{-1}$ |

FIG.8C

(Ant.1, t₁) → b₋₁

| | $t_1$ | $t_2$ | $t_1$ | $t_2$ | $t_1$ | $t_2$ | $t_1$ | $t_2$ |
|---|---|---|---|---|---|---|---|---|
| Ant.1 | $b_{-1}$ | $-a_{-1}$ | $b_{-1}$ | $a_{-1}$ | $b_{-1}$ | $a_{-1}$ | $b_{-1}$ | $-a_{-1}$ |
| Ant.2 | $a$ | $b$ | $a$ | $-b$ | $-a$ | $b$ | $-a$ | $-b$ |
| Ant.1 | $-b_{-1}$ | $a_{-1}$ | $-b_{-1}$ | $-a_{-1}$ | $-b_{-1}$ | $-a_{-1}$ | $-b_{-1}$ | $a_{-1}$ |
| Ant.2 | $a$ | $b$ | $a$ | $-b$ | $-a$ | $b$ | $-a$ | $-b$ |
| Ant.1 | $b_{-1}$ | $-a$ | $b_{-1}$ | $a$ | $b_{-1}$ | $a$ | $b_{-1}$ | $-a$ |
| Ant.2 | $a_{-1}$ | $b$ | $a_{-1}$ | $-b$ | $-a_{-1}$ | $b$ | $-a_{-1}$ | $-b$ |
| Ant.1 | $-b_{-1}$ | $a$ | $-b_{-1}$ | $-a$ | $-b_{-1}$ | $-a$ | $-b_{-1}$ | $a$ |
| Ant.2 | $a_{-1}$ | $b$ | $a_{-1}$ | $-b$ | $-a_{-1}$ | $b$ | $-a_{-1}$ | $-b$ |

DEVICE AND METHOD FOR ESTIMATING CHANNEL IN COMMUNICATION SYSTEM

CROSS-REFERENCE TO RELATED APPLICATIONS AND CLAIM OF PRIORITY

This application is a National Phase Entry of PCT International Application No. PCT/KR2016/003868, which was filed on Apr. 14, 2016, and claims a priority to Korean Patent Application No. 10-2015-0054527, which was filed on Apr. 17, 2015, and Korean Patent Application No. 10-2015-0103892, which was filed on Jul. 22, 2015 the contents of which are incorporated herein by reference.

TECHNICAL FIELD

The present disclosure relates to a communication technique for fusing, with IoT technology, a 5G communication system for supporting a data transmission rate higher than that of a 4G communication system; and a system therefor.

BACKGROUND

To satisfy demands for wireless data traffic having increased since commercialization of 4th-Generation (4G) communication systems, efforts have been made to develop improved 5th-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mmWave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Internet, which is a human-oriented connectivity network where humans generate and consume information, is now evolving to the Internet of Things (IoT) where distributed entities, such as things, exchange and process information. The Internet of Everything (IoE) has also emerged, which is a combination of the IoT technology and the Big Data processing technology through connection with a cloud server.

As technology elements, such as sensing technology, wired/wireless communication and network infrastructure, service interface technology, and security technology, have been demanded for IoT implementation, a sensor network, a Machine to Machine (M2M), Machine Type Communication (MTC), and so forth have been recently researched for connection between things.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances, advanced medical services, and so forth through convergence and combination between existing IT and various industries.

Thus, various attempts have been made to apply 5G communication systems to IoT networks. For example, 5G communication technologies such as sensor networks, things communication, MTC, etc., have been implemented by schemes such as beamforming, MIMO, array antennas, and so forth. Application of the cloud RAN as the Big Data Processing technology may also be an example of convergence of the 5G technology and the IoT technology.

Meanwhile, one of methods for satisfying high traffic demands in a communication system is to use a broad frequency bandwidth. In frequencies used in most communication systems (i.e., frequencies less than 5 GHz), a broad frequency bandwidth is difficult to secure, such that a frequency bandwidth needs to be secured among high frequencies. The Institute of Electrical and Electronics Engineers (IEEE) 802.11ad is the standard for providing a high data rate of several giga bits per second by using a broad frequency bandwidth in a 60 GHz band.

Channel estimation in IEEE 802.11ad is performed in a channel estimation field (CEF) period in a transmission packet, and a Golay code is used as a pilot for the channel estimation. The Golay code is a binary sequence including +1 and −1, and two sequences form one pair. By using characteristics of correlation of a Golay code pair, a channel may be estimated.

However, the current IEEE 802.11ad standard has been designed based on a single-input single-output (SISO) system, but has been determined to be extended to a multiple-input multiple-output (MIMO) system in the future pre-5G or post-11ad standard. To enable MIMO transmission in a pre-5G or post-11ad system, a scheme for efficiently estimating a channel in the MIMO system is required.

SUMMARY

The present disclosure provides an apparatus and method for estimating a channel when multiple antennas are used in a communication system.

The present disclosure also provides an apparatus and method for estimating a channel by using characteristics of correlation of channel estimation codes, when multiple antennas are used in a communication system.

A method for estimating a channel in a communication system according to an embodiment of the present invention includes determining a code and an antenna identification scheme that are used for channel estimation, generating a channel estimation code based on the determined code and antenna identification scheme, and transmitting the generated channel estimation code through a plurality of transmission antennas.

A method for estimating a channel in a communication system according to an embodiment of the present invention includes determining a channel estimation code generated based on a code and an antenna identification scheme that are used for channel estimation, for each reception antenna, determining correlation characteristics of the determined channel estimation code, and estimating a channel based on the determined correlation characteristics.

An apparatus for estimating a channel in a communication system according to an embodiment of the present invention includes a controller configured to determine a code and an antenna identification scheme that are used for channel estimation and generate a channel estimation code based on the determined code and antenna identification scheme, and a transmitter configured to transmit the generated channel estimation code through a plurality of transmission antennas.

An apparatus for estimating a channel in a communication system according to an embodiment of the present invention includes a receiver configured to receive a channel estimation code generated based on a code and an antenna identification scheme that are used for channel estimation, for each of a plurality of reception antennas, and a controller configured to determine correlation characteristics of the channel estimation code and to estimate a channel based on the determined correlation characteristics.

BRIEF DESCRIPTION OF THE DRAWINGS

FIGS. 8A through 8D illustrate channel estimation code combinations that satisfy conditions for generating a channel estimation code according to the second embodiment of the present disclosure;

FIG. 15 is a diagram for describing a method for transmitting a channel estimation code for 4×4 MIMO channel estimation based on the third embodiment of the present disclosure;

FIG. 16 is a diagram for describing a method for transmitting a channel estimation code for 4×4 MIMO channel estimation based on a combination of the third embodiment of the present disclosure and the fourth embodiment of the present disclosure;

FIG. 17 is a diagram for describing a method for transmitting a channel estimation code for 4×4 MIMO channel estimation based on the fourth embodiment of the present disclosure;

DETAILED DESCRIPTION

Hereinafter, exemplary embodiments of the present invention will be described in detail with reference to the accompanying drawings. In the following description, only parts necessary for understanding of operations according to embodiments of the present disclosure will be described and other parts will not be described not to obscure the subject matter of the present disclosure.

The main subject matter of the present disclosure includes generating a channel estimation code for each transmission antenna based on a type of a code and an antenna identification scheme that are to be used for channel estimation in a transmission side and transmitting the generated channel estimation code. The main subject matter of the present disclosure also includes receiving a channel estimation code for each reception antenna and estimating a channel based on characteristics of correlation of the received channel estimation code in a reception side.

To this end, a detailed description will be made of an apparatus and method for estimating a channel in a communication system according to an embodiment of the present disclosure.

Figure 1:
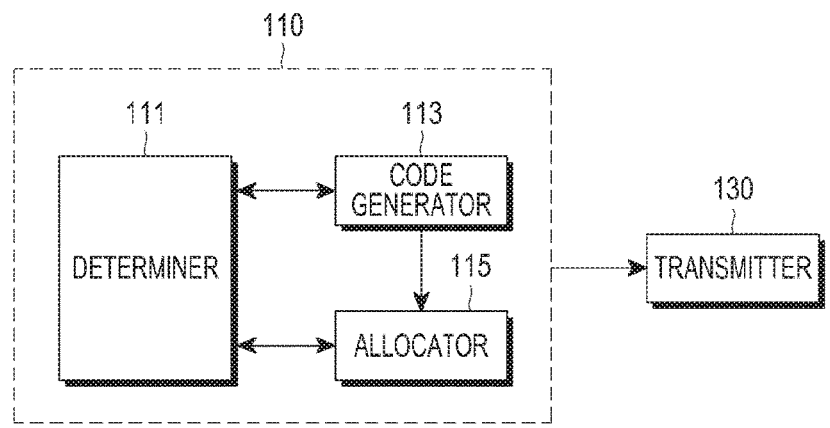
FIG. 1 is a block diagram of an apparatus for estimating a channel in a transmission side of a communication system according to an embodiment of the present disclosure.

FIG. 1 is a block diagram of an apparatus for estimating a channel in a transmission side of a communication system according to an embodiment of the present disclosure.

Referring to FIG. 1, the transmission side of the communication system according to an embodiment of the present disclosure may include a determiner 111, a code generator 113, an allocator 115, and a transmitter 130. Herein, the determiner 111, the code generator 113, and the allocator 115 may be implemented with one controller 110.

The determiner 111 determines a code for channel estimation or a channel estimation code and delivers the identified code to the generator 113. That is, the determiner 111 may determine that one of a Golay code and a Zadoff-Chu code is used for channel estimation. Herein, the channel estimation code may be previously determined between the transmission side and the reception side or may be selected by the determiner 111 every channel estimation, depending on a configuration of a communication system.

The determiner 111 determines an antenna identification scheme for an antenna through which the channel estimation code is transmitted, and delivers the determined antenna identification scheme to the code generator 113. Herein, the antenna identification scheme may be previously determined between the transmission side and the reception side or may be selected by the determiner 111 every channel estimation, depending on the configuration of the communication system. To perform channel estimation for MIMO in a pre-5G/post-11ad system, it is necessary to identify the antenna through which the channel estimation code is to be transmitted, so that the reception side may all channel estimation codes received through antennas for channel estimation. To this end, the antenna identification scheme may generally include an identification scheme using a time resource, an identification scheme using a frequency resource, and an identification scheme using a code. However, since in an IEEE 802.11ad system, a preamble included in a channel estimation field (CEF) period is based on a single carrier and the future pre-5G/post-11ad system is expected to use a single-carrier-based preamble, the identification scheme using the frequency resource may not be considered in the 11ad system. Thus, an embodiment of the present disclosure will consider only the identification scheme using the time resource and the identification scheme using the code as the antenna identification scheme. Hereinafter, in an embodiment of the present disclosure, a method for estimating a channel using the identification scheme using the time resource and the identification scheme using the code for each code, respectively, will be described.

The code generator 113 generates a channel estimation code based on the code and antenna identification scheme determined by the determiner 111. Herein, a detailed description will be made below with reference to FIGS. 5 through 15 of embodiments where a channel estimation code is generated based on the determined code and antenna identification scheme using another method.

The allocator 115 allocates a transmission period for each transmission antenna and allocates the generated channel estimation code to the allocated transmission period. The transmitter 130 then transmits a CEF period including the channel estimation code allocated to the transmission period for each antenna to the reception side.

Figure 2:
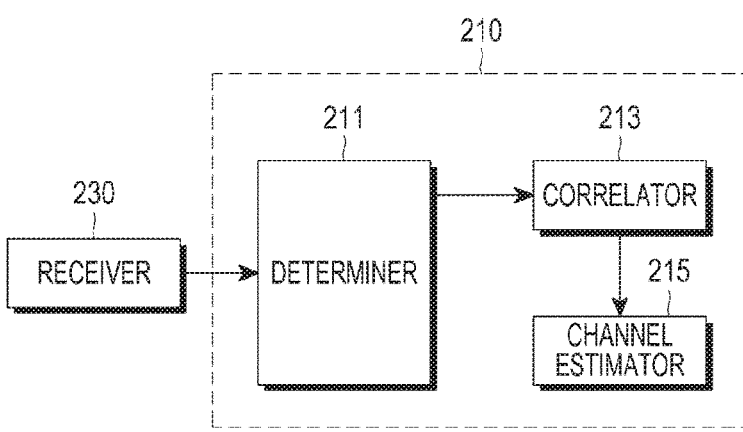
FIG. 2 is a block diagram of an apparatus for estimating a channel in a reception side of a communication system according to an embodiment of the present disclosure.

FIG. 2 is a block diagram of an apparatus for estimating a channel in a reception side of a communication system according to an embodiment of the present disclosure.

Referring to FIG. 2, the reception side of the communication system according to an embodiment of the present disclosure may include a receiver 230, a determiner 211, a correlator 213, and a channel estimator 215. Herein, the determiner 211, the correlator 213, and the channel estimator 215 may be implemented with one controller 210.

The receiver 230 receives a CEF period including a channel estimation code from a transmission side through a plurality of reception antennas.

The determiner 211 determines a code for channel estimation for each reception antenna from the received CEF period. The determiner 211 determines whether the channel estimation code is a Golay code or a Zadoff-Chu code, and whether the channel estimation code is transmitted based on the identification scheme using the time resource or the identification scheme using the code. The determiner 211 delivers the determined channel estimation code to the correlator 213. In another embodiment, the determiner 211 directly generates the channel estimation code in the same manner as in the transmission side by using the determined type of the channel estimation code (a Golay code or a Zadoff-Chu code) and antenna identification scheme and delivers the generated channel estimation code to the correlator 213.

The correlator 213 determines characteristics of correlation of a channel estimation code determined for each reception antenna. The channel estimator 215 estimates a channel for each reception antenna based on the determined correlation characteristics.

Hereinbelow, a detailed description will be made of a method for estimating a channel in a communication system according to embodiments of the present disclosure. Among the following embodiments of the present disclosure, a first embodiment and a second embodiment of the present disclosure include generating a channel estimation code using a Golay code and a third embodiment and a fourth embodiment of the present disclosure include generating a channel estimation code using a Zadoff-Chu code. The first embodiment and the third embodiment of the present disclosure include transmitting a channel estimation code based on the time resource-based antenna identification scheme, and the second embodiment and the fourth embodiment of the present disclosure include transmitting a channel estimation code based on the code-based antenna identification scheme.

The Golay code is a binary sequence including +1 or −1, and two sequences form one pair. Herein, each of the two sequences of a Golay code pair will be referred to as a and b. A description will be made of the first embodiment and the second embodiment where the channel estimation code is generated and transmitted using the Golay code.

Figure 3:
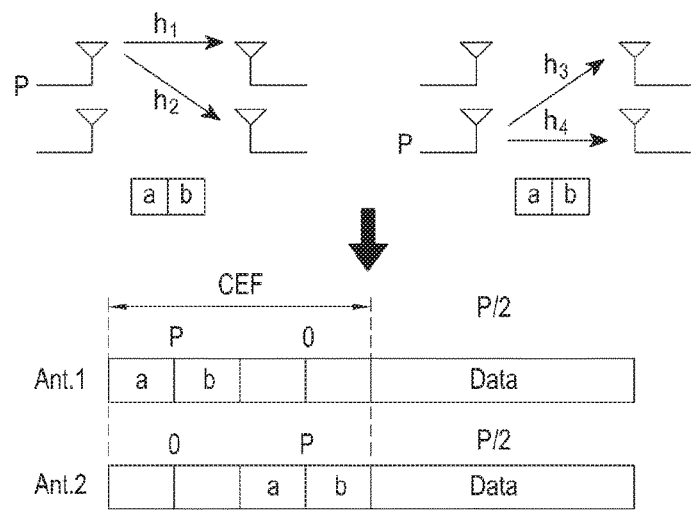
FIG. 3 is a diagram for describing a method for transmitting a channel estimation code based on a Golay code and a time resource-based antenna identification scheme according to a first embodiment of the present disclosure.

FIG. 3 is a diagram for describing a method for transmitting a channel estimation code based on a Golay code and a time resource-based antenna identification scheme according to the first embodiment of the present disclosure. In FIG. 3, it is assumed that a code used to perform channel estimation is a Golay code, and a channel estimation code is transmitted based on a time resource-based antenna identification scheme. A communication system of FIG. 3 is assumed to include two transmission antennas in the transmission side and two reception antennas in the reception side.

Referring to FIG. 3, the controller 110 generates a channel estimation code to be transmitted for each transmission antenna by using a Golay code. In the first embodiment of the present disclosure, since the antenna identification scheme based on the time resource is used, a channel estimation code is transmitted during a different period for each transmission antenna. As such, since a channel estimation code is transmitted during a different period in the transmission side, interference does not occur between received channel estimation codes when the reception side receives the channel estimation codes. The controller 110 may transmit the same channel estimation code through each antenna and thus generates the channel estimation code with the Golay code without changing the Golay code. For example, the controller 110 may generate channel estimation codes (a, b), which are to be transmitted to two reception antennas, respectively, that exist in the reception side by using a first transmission antenna (Ant.1). The controller 110 may generate channel estimation codes (a, b), which are to be transmitted to two reception antennas, respectively, that exist in the reception side by using a second transmission antenna (Ant.2).

The controller 110 time-divides the CEF period into as many periods as transmission antennas and allocates channel estimation codes to a different time period for each transmission antenna. The controller 110 controls the transmitter 130 to transmit the CEF period including the channel estimation codes to the reception side. In a period to which no channel estimation code is allocated, any information should not be transmitted.

For example, the controller 110 may divide the CEF period into two time periods because the number of transmission antennas is 2 in FIG. 3. The controller 110 allocates the channel estimation codes (a, b) to one time period allocated to the first transmission antenna (Ant.1) and does not include other information in the remaining time periods. The controller 110 also allocates the channel estimation codes (a, b) to one time period allocated to the second transmission antenna (Ant.2) and does not include other information in the remaining time periods.

As described above, the first embodiment of the present disclosure increases a time resource to as many time resources as transmission antennas based on an existing 11ad-based SISO channel estimation scheme. It can be seen from the first embodiment of the present disclosure that two time periods ($t_0$, $t_1$) are needed for transmission of channel estimation codes for one transmission antenna. Thus, a 2×2 MIMO channel estimation process may be performed by carrying out two 1×2 SIMO channel estimation. That is, referring to FIG. 3, one time period is required for single SIMO channel estimation, such that for 2×2 MIMO channel estimation, a total of two time periods are needed.

If a total transmission power in a transmission side is P, a CEF period may be transmitted using the total transmission power P because the transmitter 130 is allocated with channel estimation codes for one transmission antenna in one time period.

The transmission method according to the first embodiment of the present disclosure shown in FIG. 3 is a representative example, and the transmission side according to the first embodiment of the present disclosure should transmit channel estimation codes to satisfy all conditions described below. That is, the transmission side according to the first embodiment of the present disclosure time-divides the CEF period into as many periods as transmission antennas for allocation, alternately transmits channel estimation codes in a period allocated to each transmission antenna, and does not transmit any information in a period to which no channel estimation code is allocated.

The reception side then identifies the channel estimation codes received from the transmission side, and estimates a channel based on correlation characteristics of the channel estimation codes for each reception antenna. Such a channel estimation method may be performed in the same manner as a channel estimation method of an 11ad system. For example, the channel estimation method of the 11ad system has the following correlation characteristics when correlation between a Golay code pair is expressed as $R_{aa}$ and $R_{bb}$.

$$R_{aa}(n)+R_{bb}(n)=\delta(n) \quad \text{[Equation 1]}$$

When SISO channel estimation is performed using characteristics of <Equation 1>, if the reception side transmits a and b in two time periods ($t_0$, $t_1$), respectively, a signal received in each time period may be expressed as a convolution (*) of a transmitted signal and a first channel $h_1$. The reception side then obtains a total of four output signals by correlating the signal received in each time period with a and b, and estimates the first channel $h_1$ according to Golay code characteristics by summing a first output signal and a fourth output signal.

Figure 4:
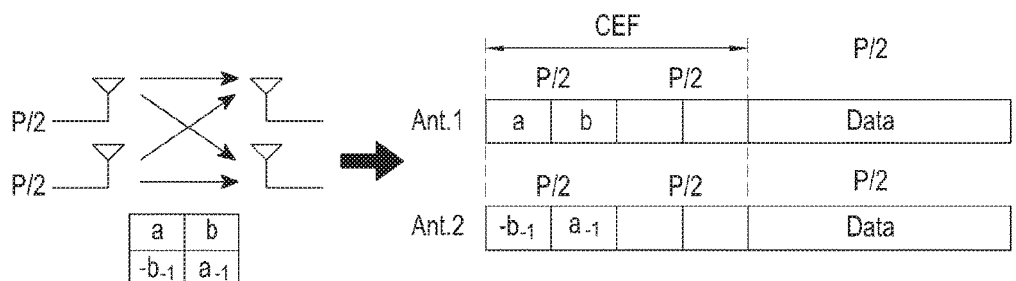
FIG. 4 is a diagram for describing a method for transmitting a channel estimation code based on a Golay code and a time resource-based antenna identification scheme according to a second embodiment of the present disclosure.

FIG. 4 is a diagram for describing a method for transmitting a channel estimation code based on a Golay code and a code-based antenna identification scheme according to a second embodiment of the present disclosure. In FIG. 4, it is assumed that a code used to perform channel estimation is a Golay code, and a channel estimation code is transmitted based on the code-based antenna identification scheme. A communication system of FIG. 4 is assumed to include two transmission antennas in the transmission side and two reception antennas in the reception side.

Referring to FIG. 4, the controller 110 generates channel estimation codes to be transmitted for each transmission antenna by using Golay codes. The second embodiment of the present disclosure has to transmit channel estimation codes having different sequences for two antennas because of using the code-based antenna identification scheme. Thus, the controller 110 generates channel estimation codes (a, b), which are to be transmitted to two reception antennas, respectively, that exist in the reception side by using a first antenna (Ant.1). The controller 110 generates channel estimation codes ($-b_{-1}$, $a_{-1}$), which are to be transmitted to two reception antennas, respectively, that exist in the reception side by using a second antenna (Ant.2). Herein, to generate channel estimation codes having different sequences for two transmission antennas, the controller 110 generates channel estimation codes, which are to be transmitted to two antennas, respectively, existing in the reception side by using the first antenna (Ant.1), with Golay codes without changing the Golay codes, and generates channel estimation codes, which are to be transmitted to two antennas, respectively, existing in the reception side by using the second antenna (Ant.2), by applying time reversal to the Golay codes. A detailed method for generating a channel estimation code using the time reversal will be described with reference to FIGS. 5 through 7.

The controller 110 time-divides the CEF period into as many periods as transmission antennas and allocates channel estimation codes to the same time period for each transmission antenna. The controller 110 controls the transmitter 130 to transmit the CEF period including the channel estimation codes to the reception side. The controller 110 also controls the transmitter 130 not to transmit any information in a period to which no channel estimation code is allocated. That is, the controller 110 allocates the channel estimation codes (a, b) generated for the first antenna and the channel estimation codes ($-b_{-1}$, $a_{-1}$) generated for the second antenna to the same time period and controls the transmitter 130 to transmit the channel estimation codes to the reception side in the same period.

As such, in the second embodiment of the present disclosure, if the number of transmission antennas is 2, different sequences are transmitted for the antennas in the same period. In this case, since two periods are needed for channel estimation, the required time periods are reduced to a half of the first embodiment of the present disclosure, and the same period as in existing SISO channel estimation is needed. However, in the second embodiment of the present disclosure, power allocated to each antenna is P/2 because two transmission antennas are used for code transmission at the same time, reducing the power to a half of the first embodiment of the present disclosure.

Assuming a CEF period of the same length, in the first embodiment of the present disclosure, although transmission power used for channel estimation is two times that of the second embodiment, an estimation period per channel link is ½ of that of the second embodiment. Thus, in terms of channel estimation performance, the first embodiment and the second embodiment have the same result.

Figure 5:
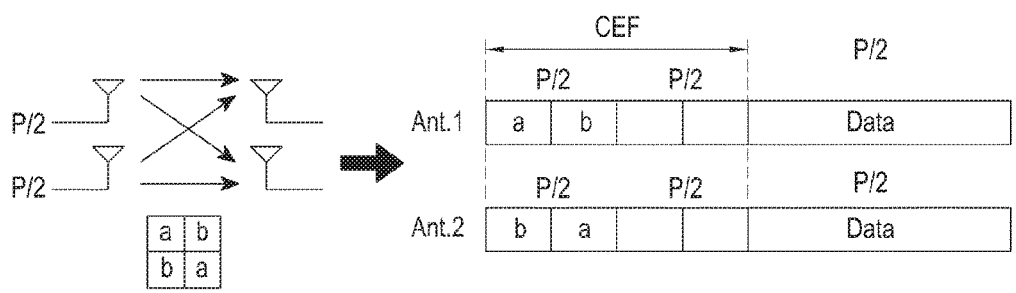
FIG. 5 illustrates an example where interference occurs during transmission of a channel estimation code according to the second embodiment of the present disclosure.

Meanwhile, when the same channel estimation codes are used for the two antennas as shown in FIG. 5 in the second embodiment, interference may occur during channel estimation.

FIG. 5 illustrates an example where interference occurs during transmission of a channel estimation code according to the second embodiment of the present disclosure.

Referring to FIG. 5, the controller 110 uses different channel estimation codes to identify a signal transmitted from each of two transmission antennas. However, the two transmission antennas transmit the channel estimation codes at the same time, interference may occur during channel estimation of the reception side. To describe a case where interference occurs, 2×1 MISO channel estimation will be used as an example.

Figure 6:
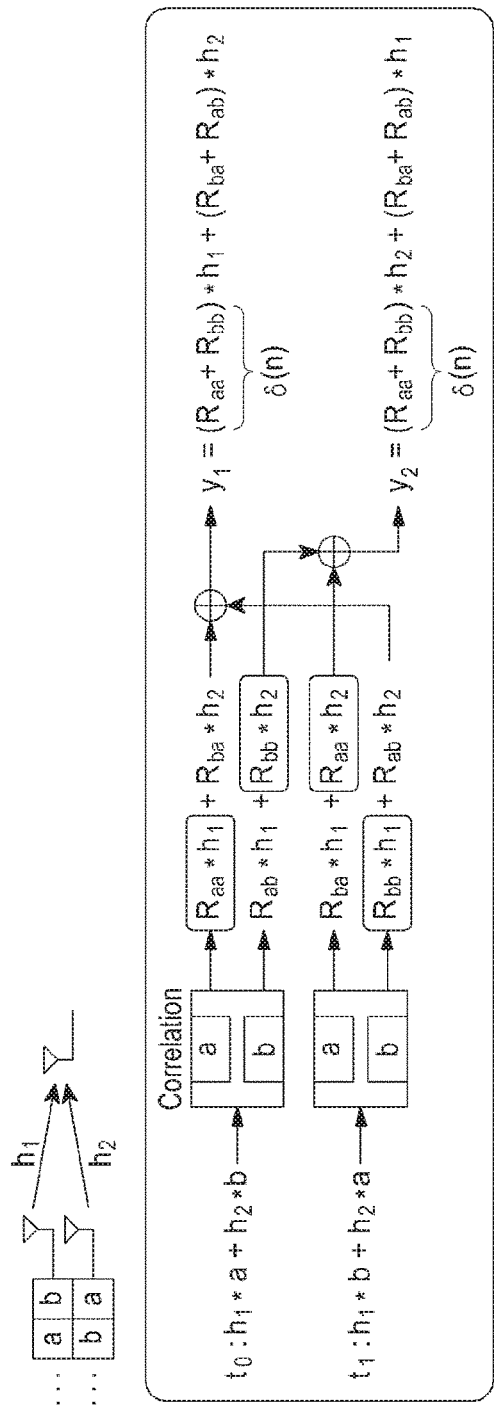
FIG. 6 is a diagram for describing a method for receiving a channel estimation code transmitted according to the second embodiment of the present disclosure.

FIG. 6 is a diagram for describing a method for receiving a channel estimation code transmitted according to the second embodiment of the present disclosure. In FIG. 6, for convenience, channel estimation codes are received during two time periods in a 2×1 MISO system.

Referring to FIG. 6, if the transmission side transmits the channel estimation code a through a first transmission antenna and the channel estimation code b through a second transmission antenna in the same time period $t_0$, the reception side receives a signal $h_1*a+h_2*b$ in the time period $t_0$. Likewise, if the transmission side transmits the channel estimation code b through the first transmission antenna and the channel estimation code a through the second transmission antenna in the same time period $t_1$, the reception side receives a signal $h_1*b+h_2*a$ in the time period $t_1$.

The reception side correlates each of the received signals with the channel estimation codes a and b, respectively, thus obtaining a total of four output values during the two time periods. To perform channel estimation using correlation characteristics of the channel estimation codes, as shown in FIG. 6, the first output and the fourth output have to be summed to estimate $h_1$ and the second output and the third output have to be summed to estimate $h_2$. However, it can be seen that a $(R_{ba}+R_{ab})*h_2$ component works as interference during estimation of $h_1$ using $y_1$ in FIG. 6. It can also be seen that a $(R_{ba}+R_{ab})*h_1$ component works as interference during estimation of $h_2$ using $y_2$.

Figure 7:
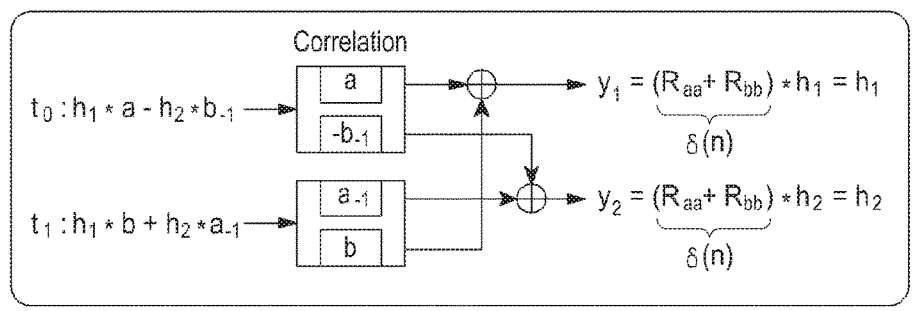
FIG. 7 is a diagram for describing a method for generating a channel estimation code from which an interference component is cancelled in a transmission side according to the second embodiment of the present disclosure.

As shown in FIG. 6, to solve the interference problem occurring during channel estimation of the reception side, the transmission side needs to generate channel estimation codes like in an example shown in FIG. 7.

FIG. 7 is a diagram for describing a method for generating a channel estimation code from which an interference component is cancelled in a transmission side according to the second embodiment of the present disclosure.

Referring to FIG. 7, the transmission side generates the channel estimation codes (a, b), which are to be transmitted to two reception antennas existing in the reception side, respectively, through the first transmission antenna, and generates the channel estimation codes ($-b_{-1}$, $a_{-1}$), which are to be transmitted to two reception antennas existing in the reception side, respectively, through the second transmission antenna. Herein, $a_{-1}$ is a time-reversed version of a, that is, indicating a reversed Golay code (RGC).

In FIG. 7, when the channel estimation codes received in the time period $t_0$ are a and $-b_{-1}$, and the channel estimation codes received in the time period $t_1$ are b and $a_{-1}$, the transmission side calculates correlation between a and b and correlation between $-b_{-1}$ and $a_{-1}$. As a result of correlation calculation, as in FIG. 7, interference components between antennas are offset in the correlation between a and b and the correlation between $-b_{-1}$ and $a_{-1}$, enabling efficient channel estimation.

The channel estimation codes in FIG. 7 are representative examples, and the transmission side according to the second embodiment of the present disclosure has to generate a channel estimation code satisfying conditions described below.

That is, the transmission side according to the second embodiment of the present disclosure generates the channel estimation codes by using different Golay sequences for each antenna in the same time period, using each of a, b, $a_{-1}$, and $b_{-1}$ only once in two time periods, and using an opposite sign for each antenna in one of the two time periods and the same sign for the antennas in the other time period. Combinations of the channel estimation codes satisfying the above conditions for generating the channel estimation codes are shown in FIGS. 8A through 8D.

Channel estimation of the reception side includes independently receiving a channel estimation code through each reception antenna and estimating a channel by using correlation characteristics of the received channel estimation code, in the same manner as the method described in the first embodiment.

As described above, in the IEEE 802.11ad, zero autocorrelation characteristics (i.e., a delta function) of Golay codes are used for channel estimation. In addition to the Golay code, a Zadoff-Chu code also satisfies the zero autocorrelation characteristics. While the Golay code satisfies the zero autocorrelation characteristics by adding a pair of a and b, the Zadoff-Chu code satisfies the zero autocorrelation characteristics with a single code. Hence, a third embodiment and a fourth embodiment using the Zadoff-Chu code will be described below.

Figure 9:
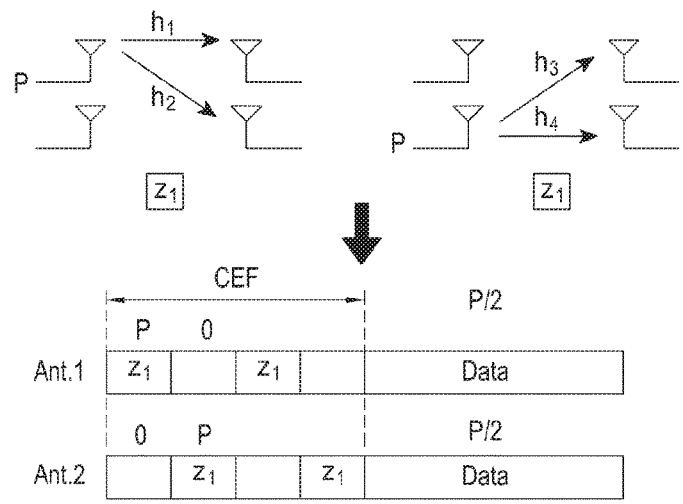
FIG. 9 is a diagram for transmitting a channel estimation code based on an antenna identification scheme using a Zadoff-Chu code and a time resource according to a third embodiment of the present disclosure.

FIG. 9 is a diagram for transmitting a channel estimation code based on an antenna identification scheme using a Zadoff-Chu code and a time resource according to the third embodiment of the present disclosure. In FIG. 9, it is assumed that a code used to perform channel estimation is a Golay code, and a channel estimation code is transmitted based on a time resource-based antenna identification scheme. A communication system of FIG. 9 is assumed to include two transmission antennas in the transmission side and two reception antennas in the reception side.

Referring to FIG. 9, the controller 110 generates channel estimation codes to be transmitted for each transmission antenna by using a Zadoff-Chu code. In the third embodiment of the present disclosure, since the antenna identification scheme based on the time resource is used, a channel estimation code is transmitted during a different time period for each transmission antenna. As such, since a channel estimation code is transmitted during a different period in the transmission side, interference does not occur between received channel estimation codes when the reception side receives the channel estimation codes. The controller 110 may transmit the same channel estimation code through each antenna and thus generates the channel estimation code with the Zadoff-Chu code without changing the Zadoff-Chu code. For example, the controller 110 may generate a Zadoff-Chu code $z_1$, which is to be transmitted to two reception antennas, respectively, that exist in the reception side by using a first antenna (Ant.1). The controller 110 may generate a Zadoff-Chu code $z_2$, which is to be transmitted to two reception antennas, respectively, that exist in the reception side by using a second antenna (Ant.2).

The controller 110 time-divides the CEF period into as many periods as reception antennas and allocates a channel estimation code to a different time period for each transmission antenna. The controller 110 controls the transmitter 130 to transmit the CEF period including the channel estimation code to the reception side. In a period to which no channel estimation code is allocated, any information should not be transmitted.

For example, the controller 110 may divide the CEF period into two time periods because the number of antennas is 2 in FIG. 9. The controller 110 allocates the channel estimation code $z_1$ to a time period allocated to the first transmission antenna (Ant.1) and allocates the channel estimation code $z_2$ to a time period allocated to the second transmission antenna (Ant.2), which is other than the time period to which the channel estimation code $z_1$ is allocated.

As such, in the third embodiment of the present disclosure, like in the first embodiment of the present disclosure, 2×2 MIMO channel estimation may be performed by being time-divided into two 1×2 SIMO channel estimation. However, the Zadoff-Chu code, unlike the Golay code, allows channel estimation with a single code, thus needing one time period for each SIMO channel estimation. Thus, when the Zadoff-Chu code is used as shown in FIG. 9, a total of two time periods are needed for 2×2 MIMO channel estimation.

The transmission method according to the third embodiment of the present disclosure shown in FIG. 9 is a representative example, and the transmission side according to the first embodiment of the present disclosure should transmit channel estimation codes to satisfy all conditions described below. That is, the transmission side according to the third embodiment of the present disclosure time-divides the CEF period into as many periods as transmission antennas for allocation, transmits a channel estimation code in a period allocated to each transmission antenna, and does not transmit any information in a period to which no channel estimation code is allocated.

The reception side then identifies the channel estimation codes received from the transmission side, and estimates a channel based on correlation characteristics of the channel estimation code for each reception antenna. Herein, a channel estimation method in each reception antenna is the same as the channel estimation method used in the existing 11ad system, and thus will not be described in detail.

Figure 10:
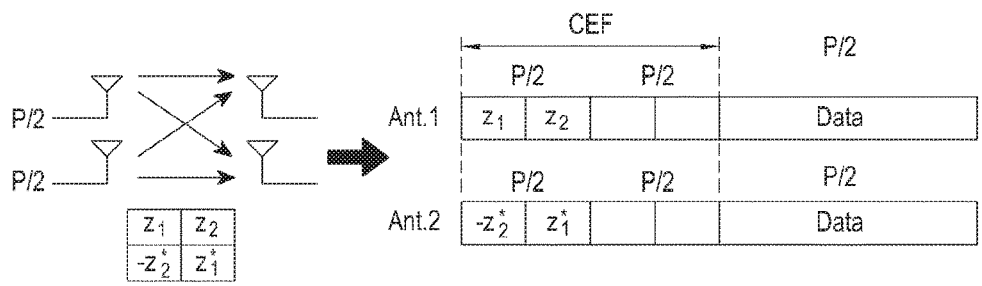
FIG. 10 is a diagram for transmitting a channel estimation code based on an antenna identification scheme using a Zadoff-Chu code and a time resource according to a fourth embodiment of the present disclosure.

FIG. 10 is a diagram for transmitting a channel estimation code based on an antenna identification scheme using a Zadoff-Chu code and a code according to a fourth embodiment of the present disclosure. In FIG. 10, it is assumed that a code used to perform channel estimation is a Zadoff-Chu code, and a channel estimation code is transmitted based on the code-based antenna identification scheme. A communication system of FIG. 10 is assumed to include two transmission antennas in the transmission side and two reception antennas in the reception side.

Referring to FIG. 10, the controller 110 generates channel estimation codes to be transmitted for each transmission antenna by using Zadoff-Chu codes. The fourth embodiment of the present disclosure has to transmit different channel estimation codes for two antennas because of using the code-based antenna identification scheme. Thus, the controller 110 generates channel estimation codes ($z_1$, $z_2$), which are to be transmitted to two reception antennas, respectively, that exist in the reception side by using a first antenna (Ant.1). The controller 110 generates channel estimation codes ($-z^*_2$, $z^*_1$), which are to be transmitted to two reception antennas, respectively, that exist in the reception side by using a second antenna (Ant.2). Herein, to generate different channel estimation codes for two transmission antennas, the controller 110 generates channel estimation codes, which are to be transmitted to two antennas, respectively, existing in the reception side by using the first antenna (Ant.1), with Zadoff-Chu codes without changing the Zadoff-Chu codes, and generates channel estimation codes, which are to be transmitted to two antennas, respectively, existing in the reception side by using the second antenna (Ant.2), by using conjugates of the Zadoff-Chu codes. A detailed method for generating a channel estimation code using a conjugate will be described with reference to FIG. 11.

The controller 110 time-divides the CEF period into as many periods as transmission antennas and allocates channel estimation codes to the same time period for each transmission antenna. The controller 110 controls the transmitter 130 to transmit the CEF period including the channel estimation codes to the reception side. The controller 110 also controls the transmitter 130 not to transmit any information in a period to which no channel estimation code is allocated. That is, the controller 110 allocates the Zadoff-Chu codes ($z_1$, $z_2$) generated for the first antenna and the Zadoff-Chu codes ($-z^*_2$, $z^*_1$) generated for the second antenna to the first time period and controls the transmitter 130 to transmit the Zadoff-Chu codes to the reception side in the first time period.

As such, in the fourth embodiment of the present disclosure, if the number of transmission antennas is 4, different sequences are transmitted for the antennas in the same period. In this case, since two periods are needed for channel estimation, the required time periods are reduced to a half of the first embodiment of the present disclosure, and the same period as in existing SISO channel estimation is needed. However, in the fourth embodiment of the present disclosure, power allocated to each antenna is P/4 because two transmission antennas are used for code transmission at the same time, reducing the power to a half of the third embodiment of the present disclosure.

Assuming a CEF period of the same length, in the third embodiment of the present disclosure, although transmission power used for channel estimation is two times that of the fourth embodiment, an estimation period per channel link is ¾ of that of the fourth embodiment. Thus, in terms of channel estimation performance, the third embodiment and the fourth embodiment have the same result.

Figure 11:
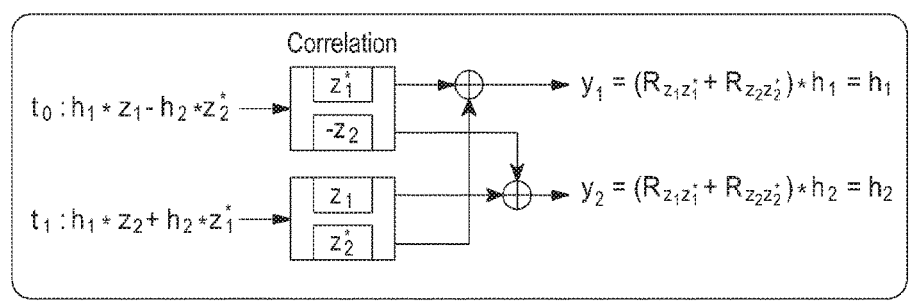
FIG. 11 is a diagram for describing a method for receiving a channel estimation code transmitted according to the fourth embodiment of the present disclosure.

The reception side having received the channel estimation codes from the transmission side according to the fourth embodiment of the present disclosure may operate as shown in FIG. 11.

FIG. 11 is a diagram for describing a method for receiving a channel estimation code transmitted according to the fourth embodiment of the present disclosure. In FIG. 11, for convenience, channel estimation codes are received during two time periods in a 2×1 MISO system.

Referring to FIG. 11, the reception side receives channel estimation codes for each reception antenna and estimates a channel based on characteristics of correlation of the received channel estimation codes. From the channel estimation codes received by the reception side from the transmission, an interference component has been cancelled to prevent interference from occurring during channel estimation.

That is, since a Zadoff-Chu code has a symmetric structure, the transmission side uses a Zadoff-Chu code as a channel estimation code to be transmitted through a first antenna, and generates a channel estimation code to be transmitted through a second antenna, by taking a conjugate of the Zadoff-Chu code.

Thus, if the reception side receives the channel estimation codes as shown in FIG. 11 during channel estimation, interference components between antennas are offset, allowing efficient channel estimation.

The channel estimation codes using the Zadoff-Chu codes as shown in FIG. 11 are representative examples, and the transmission side according to the fourth embodiment of the present disclosure has to generate a channel estimation code satisfying conditions described below.

That is, the transmission side according to the fourth embodiment of the present disclosure generates the channel estimation codes by using different channel estimation codes for each antenna in the same time period, using each of $z_1$, $z_2$, $z^*_1$, and $z^*_2$ only once in two time periods, and using an opposite sign for each antenna in one of the two time periods and the same sign for the antennas in the other time period.

Channel estimation of the reception side includes independently receiving a channel estimation code through each reception antenna and estimating a channel by using correlation characteristics of the received channel estimation code, in the same manner as the method described in the third embodiment.

While channel estimation in the 2×2 MIMO system has been described in the first through fourth embodiments of the present disclosure, channel estimation may be performed in a 4×4 MIMO system by extending the first through fourth embodiments of the present disclosure.

For example, the time resource-based antenna identification scheme according to the first embodiment of the present disclosure may be equally extended to a case where the number of antennas is four. Such extension based on the first embodiment of the present disclosure is achieved by 1×4 SIMO channel estimation four times for 4×4 MIMO channel estimation. That is, the transmission side may transmit channel estimation codes using Golay codes as shown in FIG. 12 in a CEF period.

Figure 12:
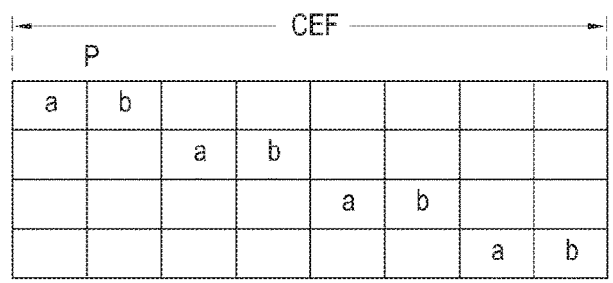
FIG. 12 is a diagram for describing a method for transmitting a channel estimation code for 4×4 MIMO channel estimation based on the first embodiment of the present disclosure.

FIG. 12 is a diagram for describing a method for transmitting a channel estimation code for 4×4_MIMO channel estimation based on the first embodiment of the present disclosure.

Referring to FIG. 12, two time periods are required for one 1×4 SIMO channel estimation, such that the transmission side transmits channel estimation codes using Golay codes in a total of eight time periods for 4×4 MIMO channel estimation. In an embodiment extending the first embodiment of the present disclosure, only one antenna performs transmission in one period, and thus a transmission antenna may use the maximum transmission power P.

In another example, Golay codes form one pair with two sequences, and thus an antenna identification scheme using different codes as in the second embodiment may be effective when the number of transmission antennas is 2. Hence, when the number of transmission antennas is 4, a method for transmitting channel estimation codes through two antennas in one period may be used by combining the first embodiment with the second embodiment.

Figure 13:
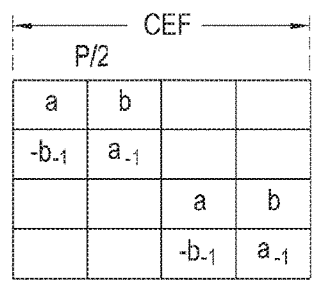
FIG. 13 is a diagram for describing a method for transmitting a channel estimation code for 4×4 MIMO channel estimation based on a combination of the first embodiment of the present disclosure and the second embodiment of the present disclosure.

FIG. 13 is a diagram for describing a method for transmitting a channel estimation code for 4×4 MIMO channel estimation based on a combination of the first embodiment of the present disclosure and the second embodiment of the present disclosure.

Referring to FIG. 13, 4×4 MIMO channel estimation is performed by performing 2×4 MIMO channel estimation twice based on a combination of the first embodiment of the present disclosure and the second embodiment of the present disclosure. In this case, the transmission side transmits channel estimation codes in four time periods for channel estimation. However, in an embodiment based on the combination of the first embodiment of the present disclosure and the second embodiment of the present disclosure, each transmission antenna may use power P/2, such that the embodiment of FIG. 13 shows the same channel estimation performance as that of the embodiment of FIG. 12 with respect to the same CEF period.

In another example, when a length of a Golay code is N, a Golay code shifted by N/2 may be added to perform 4×4 MIMO channel estimation based on the second embodiment without using an additional time resource. Such an embodiment may make positions of channels estimated by the reception side different by using the same Golay codes for the first antenna and the second antenna as used in 2×4 MIMO channel estimation and using Golay codes obtained by shifting the Golay codes used in 2×4 MIMO channel estimation by N/2 for the third antenna and the fourth antenna.

Figure 14:
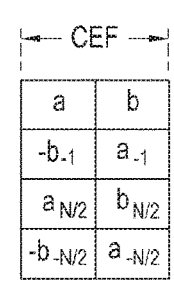
FIG. 14 is a diagram for describing a method for transmitting a channel estimation code for 4×4 MIMO channel estimation based on the second embodiment of the present disclosure.

FIG. 14 is a diagram for describing a method for transmitting a channel estimation code for 4×4 MIMO channel estimation based on the second embodiment of the present disclosure.

Referring to FIG. 14, based on the second embodiment of the present disclosure, 4×4 MIMO channel estimation is performed once using the code-based antenna identification scheme. In this case, the transmission side transmits channel estimation codes in two time periods for channel estimation. However, each transmission antenna may use power P/4, such that the embodiment of FIG. 14 shows the same channel estimation performance as in the embodiments of FIGS. 12 and 13 with respect to the same CEF period.

In another example, in the embodiment of the present disclosure, 4×4 MIMO channel estimation may be performed based on the third embodiment using a Zadoff-Chu code. That is, the third embodiment identifies an antenna using a time resource and may be equally extended to a case where the number of antennas is four. Such extension based on the third embodiment of the present disclosure is achieved by 1×4 SIMO channel estimation four times for 4×4 MIMO channel estimation. That is, the transmission side may transmit channel estimation codes using Zadoff-Chu codes as shown in FIG. 15 in a CEF period.

Figures 15, 16, 17:
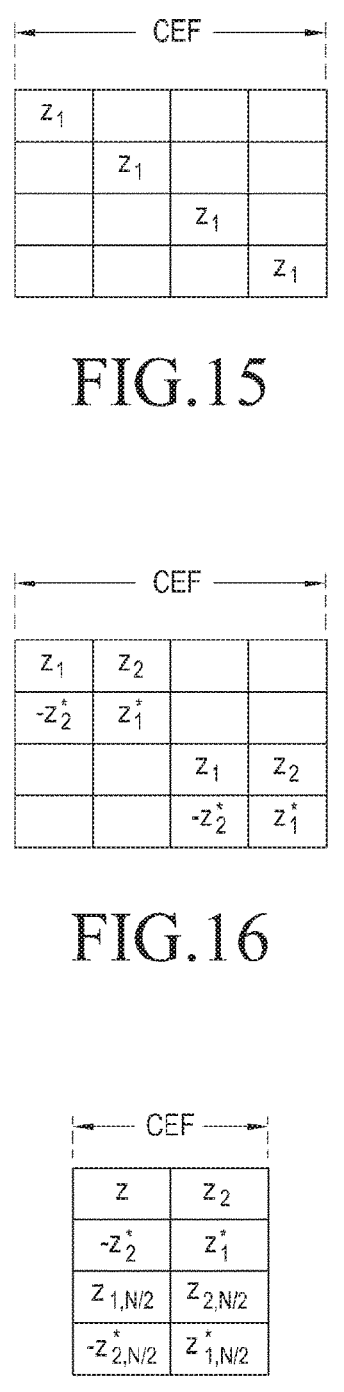

FIG. 15 is a diagram for describing a method for transmitting a channel estimation code for 4×4 MIMO channel estimation based on the third embodiment of the present disclosure.

Referring to FIG. 15, one time period is required for one 1×4 SIMO channel estimation, such that the transmission side transmits Zadoff-Chu codes in a total of four time periods for 4×4 MIMO channel estimation. In an embodiment extending the third embodiment of the present disclosure, only one antenna performs transmission in one period, and thus a transmission antenna may use the maximum transmission power P.

In another example, a Zadoff-Chu code is a single code, and thus an antenna identification scheme using different codes as in the fourth embodiment may be effective when the number of transmission antennas is 2. Hence, when the number of transmission antennas is 4, a method for transmitting channel estimation codes through two antennas in one period may be used by combining the third embodiment with the fourth embodiment.

FIG. 16 is a diagram for describing a method for transmitting a channel estimation code for 4×4 MIMO channel estimation based on a combination of the third embodiment of the present disclosure and the fourth embodiment of the present disclosure.

Referring to FIG. 16, 4×4 MIMO channel estimation is performed by performing 2×4 MIMO channel estimation twice based on a combination of the third embodiment of the present disclosure and the fourth embodiment of the present disclosure. In this case, the transmission side transmits channel estimation codes in four time periods for channel estimation. However, in an embodiment based on the combination of the third embodiment of the present disclosure and the fourth embodiment of the present disclosure, each transmission antenna may use power P/4, such that the embodiment of FIG. 16 shows the same channel estimation performance as that of the embodiment of FIG. 15 with respect to the same CEF period.

In another example, when a length of a Zadoff-Chu code is N, a Zadoff-Chu code shifted by N/2 may be added to perform 4×4 MIMO channel estimation based on the fourth embodiment without using an additional time resource. Such an embodiment may make positions of channels estimated by the reception side different by using the same Zadoff-Chu codes for the first antenna and the second antenna as used in 2×4 MIMO channel estimation and using Zadoff-Chu codes obtained by shifting the Zadoff-Chu codes used in 2×4 MIMO channel estimation by N/2 for the third antenna and the fourth antenna.

FIG. 17 is a diagram for describing a method for transmitting a channel estimation code for 4×4_MIMO channel estimation based on the fourth embodiment of the present disclosure.

Referring to FIG. 17, 4×4 MIMO channel estimation is performed once using only the code-based antenna identification scheme based on the fourth embodiment of the present disclosure, in which the transmission side performs channel estimation codes only using two time periods for channel estimation. However, each transmission antenna may use power P/4, such that the embodiment of FIG. 17 shows the same channel estimation performance as in the embodiments of FIGS. 15 and 16 with respect to the same CEF period.

Figure 18:
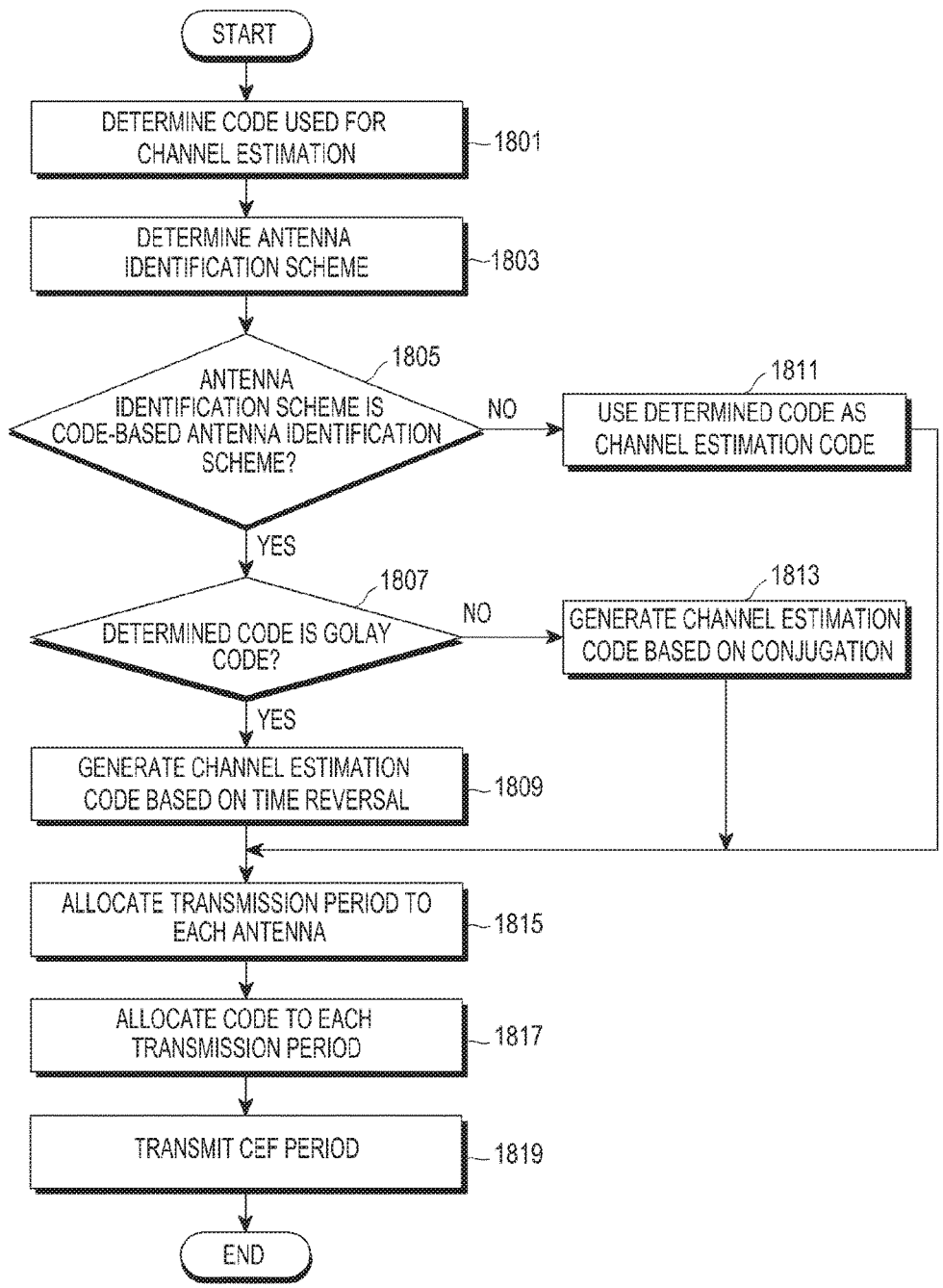
FIG. 18 is a flowchart of a method for estimating a channel in a transmission side of a communication system according to an embodiment of the present disclosure.

FIG. 18 is a flowchart of a method for estimating a channel in a transmission side of a communication system according to an embodiment of the present disclosure.

Referring to FIG. 18, the controller 110 of the transmission side determines a code for channel estimation in operation 1801. The determiner 110 may determine that one of a Golay code and a Zadoff-Chu code is used for channel estimation.

The controller 110 determines an antenna identification scheme for antennas through which the channel estimation code is to be transmitted in operation 1803. The controller 110 may determine that one of a time resource-based antenna identification scheme and a code-based antenna identification scheme may be used for channel estimation.

The controller 110 generates a channel estimation code based on the determined code and antenna identification scheme.

More specifically, the controller 110 determines whether the determined antenna identification scheme is the code-based antenna identification scheme in operation 1805. If the determined antenna identification scheme is the code-based antenna identification scheme, the controller 110 determines whether the determined code is a Golay code in operation 1807.

If the determined code is a Golay code, the controller 110 generates a channel estimation code based on a time reversal method (in operation 1809). The controller 110 needs to generate the channel estimation code in such a way not to cause interference during channel estimation of the reception side. That is, the controller 110 generates channel estimation codes by using a different Golay code for each antenna in the same time period, using each of a, b, $a_{-1}$, and $b_{-1}$ only once in two time periods, and using an opposite sign for each antenna in one of the two time periods and the same sign for the antennas in the other time period. For example, the controller 110 may generate the channel estimation codes to transmit a and b through the first antenna and transmit $-b_{-1}$ and $a_{-1}$ through the second antenna.

If the determined code is not a Golay code (that is, a Zadoff-Chu code), the controller 110 generates the channel estimation codes based on a conjugation method in operation 1813. The controller 110 needs to generate the channel estimation codes in such a way not to cause interference during channel estimation of the reception side. That is, the controller 110 generates channel estimation codes by using a different Zadoff-Chu code for each antenna in the same time period, using each of $z_1$, $z_2$, $z^*_1$, and $z^*_2$ only once in two time periods, and using an opposite sign for each antenna in one of the two time periods and the same sign for the antennas in the other time period. For example, the controller 110 may generate the channel estimation codes to transmit $z_1$ and $z_2$ through the first antenna and transmit $-z^*_2$ and $z^*_1$ through the second antenna.

On the other hand, if the determined antenna identification scheme is not the code-based antenna identification scheme (i.e., the time resource-based antenna identification scheme), the controller 110 uses the determined code as the channel estimation code in operation 1811.

The allocator 110 allocates a transmission period to each transmission antenna in operation 1815 and allocates the generated channel estimation code to the allocated transmission period in operation 1817. The controller 110 controls the transmitter 130 to transmit the CEF period including the channel estimation code allocated to the transmission period for each transmission antenna to the reception side in operation 1819. The controller 110 time-divides the CEF period into as many periods as transmission antennas to allocate the channel estimation code, transmits the channel estimation code alternately in a period allocated to each transmission antenna, and does not transmit any information in a period to which no channel estimation code is allocated in the CEF period.

Figure 19:
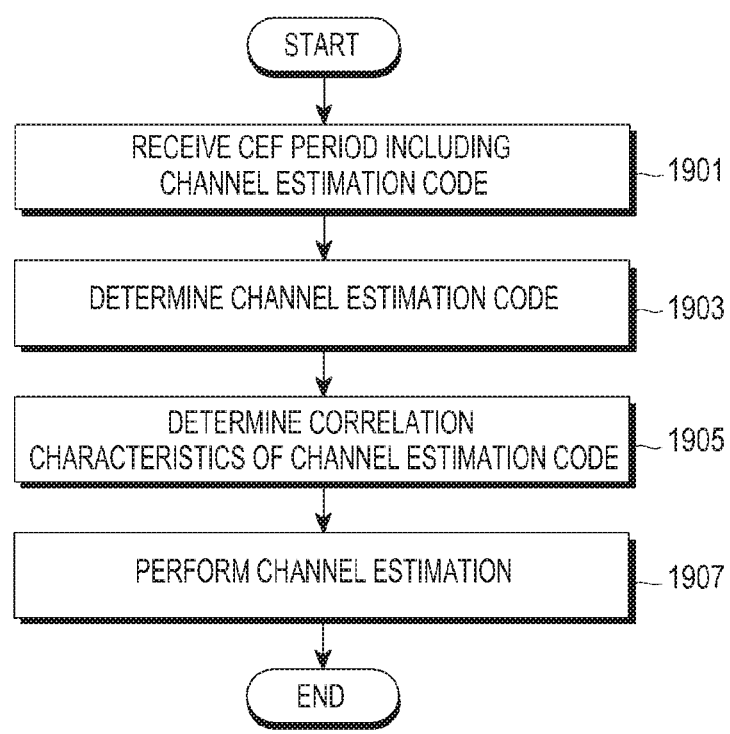
FIG. 19 is a flowchart of a method for an apparatus for estimating a channel in a reception side of a communication system according to an embodiment of the present disclosure.

FIG. 19 is a flowchart of a method for estimating a channel in a reception side of a communication system according to an embodiment of the present disclosure.

Referring to FIG. 19, the receiver 230 of the reception side receives a CEF period including a channel estimation code from a transmission side in operation 1901. The controller 210 determines a code for channel estimation for each reception antenna from the received CEF period in operation 1903. The controller 210 determines whether the channel estimation code is a Golay code or a Zadoff-Chu code, and whether the channel estimation code is transmitted based on the identification scheme using the time resource or the identification scheme using the code.

The controller 210 determines characteristics of correlation of the channel estimation code determined for each reception antenna in operation 1905. The controller 210 estimates a channel for each reception antenna based on the determined correlation characteristics in operation 1907.

Hereinbelow, effects of the first through fourth embodiments of the present disclosure will be described based on 2×2 MIMO channel estimation performance.

FIGS. 20 through 23 are graphs showing channel estimation performance according to an embodiment of the present disclosure. In FIGS. 20 through 23, channel estimation performance has been evaluated using a normalized mean square error (NMSE) between an actual channel and an estimated channel.

Figure 20:
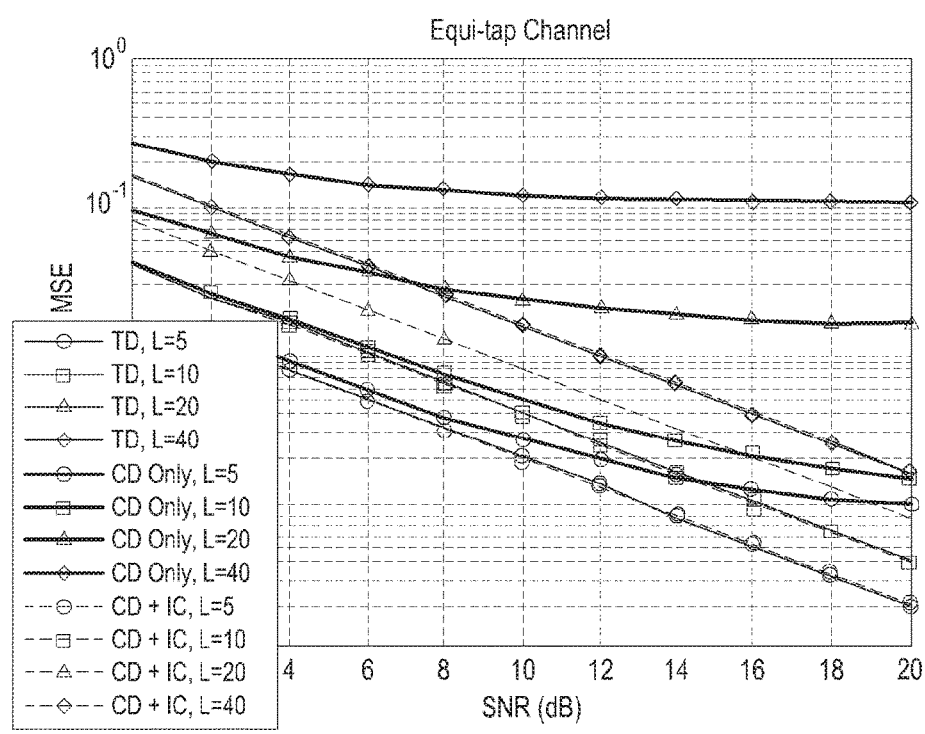
FIGS. 20 through 22 are graphs showing channel estimation performance according to an embodiment of the present disclosure.

FIG. 20 shows NMSE performance assuming that, in channels h1 through h4, amplitudes of all taps are the same and the number of taps of the channels is the same as L.

Referring to FIG. 20, time division (TD) adopts channel estimation according to the first and third embodiments of the present disclosure, code division (CD)-only adopts channel estimation using the code-based antenna identification scheme according to the second and fourth embodiments of the present disclosure, and CD+IC (interference cancellation) adopts channel estimation using the code-based antenna identification scheme and the channel estimation code for interference cancellation according to the second and fourth embodiments of the present disclosure.

From the graph of FIG. 20, it can be seen that when only CD is adopted, NMSE performance is reduced due to interference occurring during channel estimation and this phenomenon becomes prominent as the number of taps of a channel increases. As can be seen from the graph of FIG. 20, NMSE performance of TD is the same as that of CD+IC.

Figure 21:
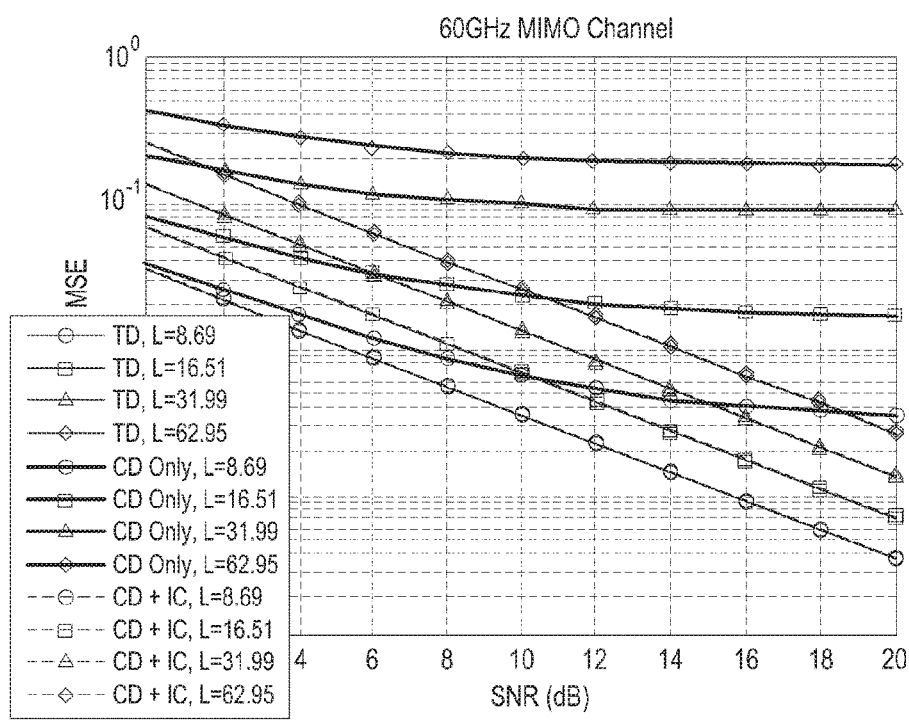

FIG. 21 shows evaluation of channel estimation according to an embodiment of the present disclosure by using a channel model actually measured in a 60 GHz band. Like the result shown in FIG. 20, it can be seen that TD and CD+IC may perform channel estimation without interference, and performance degradation caused by interference increases for more taps of a channel.

Figure 22:
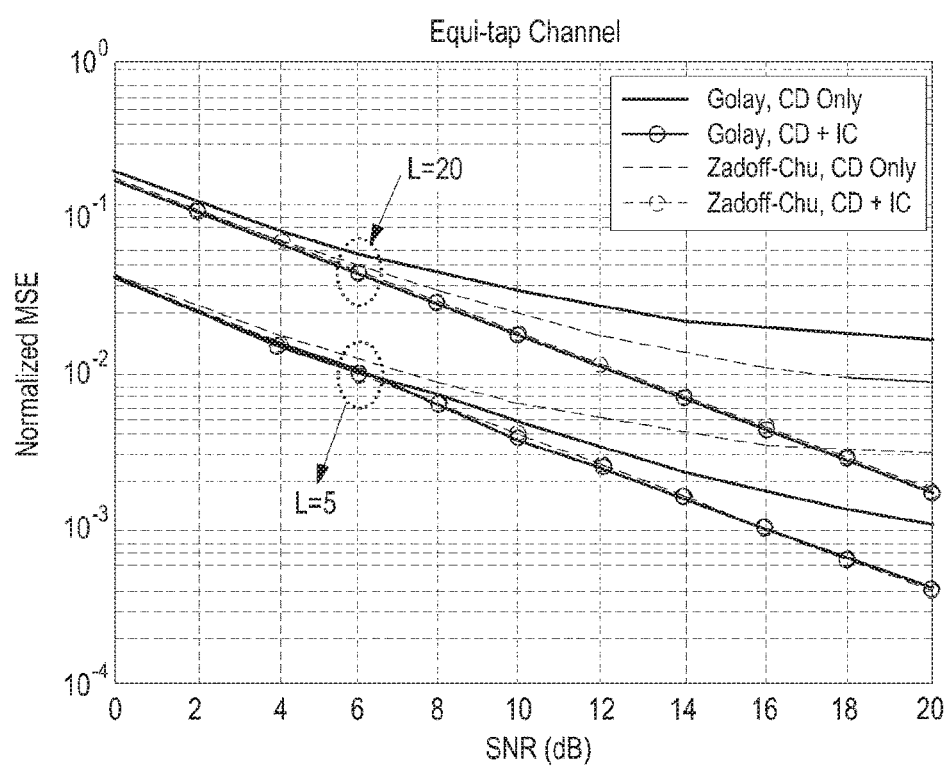

FIG. 22 shows comparison between channel estimation performance using a Zadoff-Chu code and channel estimation performance using a Golay code in the same channel as in FIG. 20. When interference cancellation is applied in channel estimation code generation according to the second and fourth embodiments of the present disclosure in FIG. 22, channel estimation performance using the Zadoff-Chu code and channel estimation performance using the Golay code are the same as each other without interference.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for estimating a channel in a communication system, the method comprising:
   determining a code and an antenna identification scheme that are used for channel estimation;
   generating a channel estimation code based on the determined code and antenna identification scheme; and
   transmitting the generated channel estimation code through a plurality of transmission antennas.

2. The method of claim 1, wherein the generating of the channel estimation code comprises generating the determined code as the channel estimation code if the determined antenna identification scheme is a time resource-based antenna identification scheme.

3. The method of claim 1, wherein the generating of the channel estimation code comprises,
   if the determined code is a Golay code and the determined antenna identification scheme is a time resource-based antenna identification scheme,
   generating the determined code as the channel estimation code for a first transmission antenna; and
   generating the channel estimation code by using time reversal of the determined code for a second transmission antenna.

4. The method of claim 1, wherein the generating of the channel estimation code comprises generating the channel estimation code by using different Golay sequences for each transmission antenna in the same time period, using each of a, b, $a_{-1}$, and $b_{-1}$ only once in two time periods, and using an opposite sign for each transmission antenna in one of the two time periods and the same sign for the transmission antennas in the other time period.

5. The method of claim 1, wherein the generating of the channel estimation code comprises,
   if the determined code is a Zadoff-Chu code and the determined antenna identification scheme is a time resource-based antenna identification scheme,
   generating the determined code as the channel estimation code for a first transmission antenna; and
   generating the channel estimation code by using a conjugate of the determined code for a second transmission antenna.

6. The method of claim 1, wherein the generating of the channel estimation code comprises generating the channel estimation code by using a different Zadoff-Chu sequence for each transmission antenna in the same time period, using each of $z_1$, $z_2$, $z^*_1$, and $z^*_2$ once in two time periods, and using an opposite sign for each transmission antenna in one of the two time periods and the same sign for the transmission antennas in the other time period.

7. The method of claim 1, wherein the transmitting of the generated channel estimation code comprises:
   time-dividing a channel estimation period into as many periods as the plurality of transmission antennas;
   allocating the generated channel estimation code to a time-divided period for each of the plurality of transmission antennas; and
   transmitting the channel estimation period to which the channel estimation code is allocated,
   and any information is not included in a period to which the generated channel estimation code is not allocated, and the generated channel estimation code is allocated to the same transmission period for each transmission antenna.

8. A method for estimating a channel in a communication system, the method comprising:
   determining a channel estimation code generated based on a code and an antenna identification scheme that are used for channel estimation, for each reception antenna;
   determining correlation characteristics of the determined channel estimation code; and
   estimating a channel based on the determined correlation characteristics.

9. The method of claim 8, wherein the code used for channel estimation comprises a Golay code and a Zadoff-Chu code.

10. The method of claim 8, wherein the channel estimation code is the same as the code used for channel estimation if the antenna identification scheme is a time resource-based antenna identification scheme.

11. The method of claim 8, wherein the channel estimation code comprises the same as the code used for channel estimation and a time-reversed code of the code used for channel estimation, if the code used for channel estimation is a Golay code and the antenna identification scheme is a time resource-based antenna identification scheme.

12. The method of claim 8, wherein the channel estimation code comprises different Golay sequences for each transmission antenna in the same time period, uses each of a, b, $a_{-1}$, and $b_{-1}$ once in two time periods, and uses an opposite sign for each transmission antenna in one of the two time periods and the same sign for the transmission antennas in the other time period.

13. The method of claim 8, wherein the channel estimation code comprises the same code as the code used for channel estimation and a conjugated code of the code used for channel estimation, if the code used for channel estimation is a Zadoff-Chu code and the antenna identification scheme is a time resource-based antenna identification scheme.

14. The method of claim 8, wherein the channel estimation code comprises a different Zadoff-Chu sequence for each transmission antenna in the same time period, uses each of $z_1$, $z_2$, $z^*_1$, and $z^*_2$ once in two time periods, and uses an opposite sign for each transmission antenna in one of the two time periods and the same sign for the transmission antennas in the other time period.

15. An apparatus for estimating a channel in a communication system, the apparatus comprising:
 a controller configured to determine a code and an antenna identification scheme that are used for channel estimation, and generate a channel estimation code based on the determined code and antenna identification scheme; and
 a transmitter configured to transmit the generated channel estimation code through a plurality of transmission antenna.

16. The apparatus of claim 15, wherein the controller generates the determined code as the channel estimation code if the determined antenna identification scheme is a time resource-based antenna identification scheme.

17. The apparatus of claim 15, wherein the controller further configured to:
 if the determined code is a Golay code and the determined antenna identification scheme is a time resource-based antenna identification scheme, generate the determined code as the channel estimation code for a first transmission antenna and generate the channel estimation code by using time reversal of the determined code for a second transmission antenna.

18. The apparatus of claim 15, wherein the controller further configured to:
 if the determined code is a Zadoff-Chu code and the determined antenna identification scheme is a time resource-based antenna identification scheme, generate the determined code as the channel estimation code for a first transmission antenna and generate the channel estimation code by using a conjugate of the determined code for a second transmission antenna.

19. An apparatus for estimating a channel in a communication system, the apparatus comprising:
 a receiver; and
 a controller configured to:
  determine a channel estimation code generated based on a code and an antenna identification scheme that are used for channel estimation for each reception antenna;
  determine correlation characteristics of the determined channel estimation code; and
  estimate a channel based on the determined correlation characteristics.

20. The method of claim 1, wherein the code used for channel estimation comprises a Golay code and a Zadoff-Chu code.

* * * * *